United States Patent [19]

Leszczynski

[11] 4,317,184

[45] Feb. 23, 1982

[54] DUAL SLOPE COMPENSATION APPARATUS

[75] Inventor: Nicholas G. Leszczynski, Tonawanda, N.Y.

[73] Assignee: NP Industries, Inc., Tonawanda, N.Y.

[21] Appl. No.: 199,869

[22] Filed: Oct. 23, 1980

[51] Int. Cl.³ ............................................. G01S 15/02
[52] U.S. Cl. ...................................... 367/13; 367/99; 367/902
[58] Field of Search ..................... 367/13, 87, 99, 107, 367/902

[56] References Cited

U.S. PATENT DOCUMENTS 3,263,206 7/1966 Brown et al. .................. 367/902 X Primary Examiner—Richard A. Farley
Attorney, Agent, or Firm—Joseph P. Gastel; Martin LuKacher

[57] ABSTRACT

A circuit providing a ramp signal having dual slopes of increasing and decreasing magnitude is controlled to provide one of its ramp portions with a slope which varies in accordance with a signal perturbing effect and the other of which is constant. The dual slope ramp duration is modified in proportion to the perturbing effect and is used to compensate therefor.

15 Claims, 4 Drawing Figures

DUAL SLOPE COMPENSATION APPARATUS

DESCRIPTION

The present invention relates to apparatus for compensating for effects which perturb signals representing measurements and particularly to compensating apparatus utilizing a dual slope ramp signal, the slope of one portion of which is varied while the slope of the other portion is held constant and which controls measurement representing signals so as to compensate them for perturbing effects.

The present invention is especially suitable for use in echo location systems for compensating such systems for changes in the velocity of propagation which effects the time interval between the transmission and reception of signals from which distance measurements may be obtained. The system is particularly adapted for use in sonic distance measuring equipment for compensation thereof for changes in the velocity of sound.

Compensation for signal perturbing effects is necessary in many instrumentation systems. Instruments using sonic signals are particularly vulnerable to the perturbing effect of changes in the velocity of sound. Such perturbing effects include variations in temperature, gas or vapor composition and any other effect which changes the velocity of sound. By the terms "sonic" and "sound" as used herein is meant the entire acoustic range, both audible and inaudible and includes the ultrasonic range where ultrasonic signals which may be of high frequency, for example up to several MHz. Sonic signals may be employed in equipment for echo sounding, distance measurement and velocity measurement. Such equipment has employed various means for compensating for changes in the velocity of sound. For example, in U.S. Pat. No. 4,145,914, issued Mar. 27, 1979, echo location distance measuring equipment is described in which a reference frequency, which is used to determine the travel time for a sonic signal, is varied in accordance with the velocity of sound. The frequency of sonic signals has been varied in accordance with the velocity of sound also in doppler sonar systems (see U.S. Pat. No. 3,496,524). Analog compensation signals have also been derived so as to compensate sonar systems for changes in the velocity of sound resulting from the changes in the temperature of the medium through which the sonic signals propagate, by measuring the temperature variation in the water (see U.S. Pat. No. 3,648,225, issued Mar. 7, 1972). Such compensation systems leave much to be desired by way of accuracy and the complexity and cost of implementation and maintenance thereof. Frequent calibration is necessary, since the circuits are not self-aligning. It is also desirable not to alter the signals themselves or to change the processing thereof to make the necessary measurements, since additional errors which are difficult to compensate arise.

It is a feature of this invention to provide compensating apparatus which operates in accordance with a principle which does not require the alteration of the sonic signals which are transmitted or changes in the processing of such signals after they are received. This principle involves the generation of a dual slope ramp signal where the slope of one portion of the ramp is varied in accordance with the perturbing effect, for example in accordance with the velocity of sound where sonic signals are transmitted and received by the instrument. While one portion of the dual slope ramp is varied in slope, the slope of the other portion is constant. This results in a ramp signal, the duration of which varies in accordance with the perturbing effect and may be used for the compensation thereof.

A particular advantage of the invention is that dual slope ramp generators are available commercially in integrated circuit form. Such integrated circuits have been developed and sold for purposes quite different from the compensation of signals for perturbing effects. Particularly, dual slope generating circuits have been used in analog to digital converter applications to change an analog input into a digital output. A typical dual slope or dual ramp integrated circuit is the type MC 1505 which is sold by Motorola Semiconductors of Phoenix, Ariz.

Accordingly, it is an object of the present invention to provide improved apparatus for the compensation of equipment, particularly instrumentation equipment, for variations in measurements which are a function of perturbing effects.

It is a further object of the invention to provide improved sonic instrumentation apparatus which is compensated for variations in sound velocity.

It is a still further object of the invention to provide improved instrumentaion apparatus which depends upon the measurement of time intervals between signals of given velocity of propagation and which is compensated for variations in propagation velocity.

It is a still further object of the invention to provide improved sonic distance measuring equipment which is compensated for changes in the velocity of sound which effects the intervals between transmitted and return or echo signals used in the equipment.

It is a still further object of the present invention to provide improved apparatus for compensating for signal propagational velocity variations which is accurate in operation, self-aligning, insensitive to component drift, and adapted for micro-processor control and which may be implemented at low cost.

It is a still further object of the present invention to provide an improved apparatus for compensating for variations in a measurement parameter, such as signal propagational velocity without complex processing of signals, as by a digital computer.

It is a still further object of the present invention to provide an improved system for compensations for variations in the velocity of sound due to temperature over a wide temperature range, for example over a 100° C. temperature range.

Briefly described, compensation apparatus embodying the invention comprises means responsive to an effect perturbing the transmission of signals, such as changes in the velocity of sound, for generating a first output corresponding thereto. Means are also provided for generating a compensating signal having dual adjacent ramp or slope portions. The slope of one of the portions is dependent upon the first output and the slope of the other portion is constant. The signals from which the measurements are made are used to time the occurrence of the slope portions. The compensation for the perturbing effect is made in accordance with duration of the dual slope compensating signal. The time of occurrence of a return signal in sonic distance measurement equipment may be adjusted in accordance with the duration of the constant slope portion of the compensating signal and occurs later with respect to the actual returned echo when the sound velocity is increased, as when the temperature rises, than when the temperature is low and the velocity of sound is reduced.

The foregoing and other objects, features and advantages of the invention, as well as a presently preferred embodiment thereof, will become more apparent from a reading of the following description in connection with the accompanying drawings in which.

Figure 1:
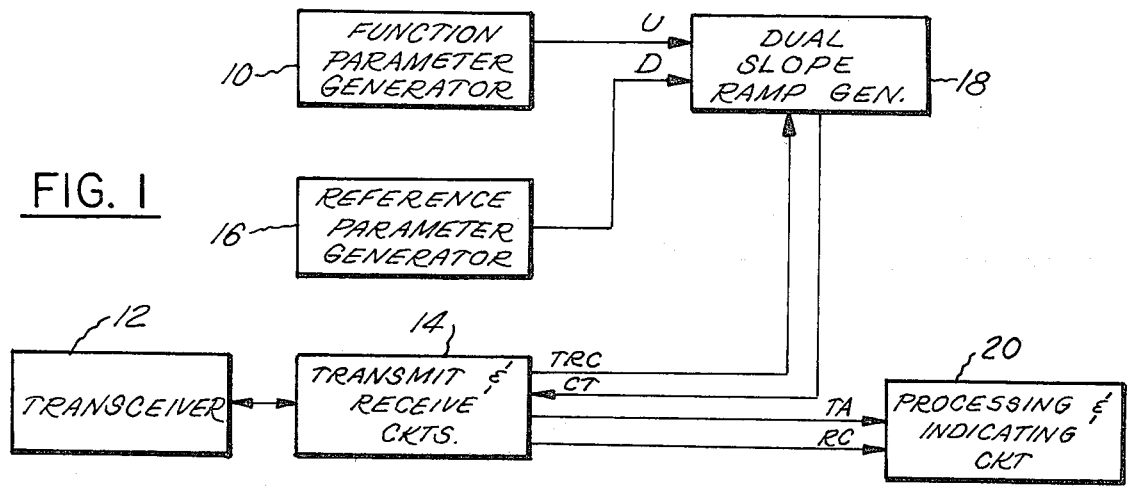
FIG. 1 is a generalized block diagram of a distance measuring equipment which is compensated for variations in signal propagating velocity, in accordance with the invention.

Referring more particularly to FIG. 1 there is shown instrumentation apparatus which operates by the transmission of signals through an environment, the transmission characteristics of which may change depending upon the nature of the environment. If the environment is air and the signals are sound signals the transmission characteristic which is subject to wide variation is the velocity of sound which changes with the temperature of the air. Pressure, and density and composition of the gas or vapor mixture constituting the air are other characteristics which can effect sound velocity. It should be understood that any equipment which is perturbed by an effect or parameter which may be measured, directly or indirectly, such as sound velocity, temperature, density, pressure may be used to control the system. To this end a function parameter generator 10 which detects the perturbing parameter or a function thereof and provides an output control signal is used in the apparatus shown in FIG. 1. The equipment which is compensated is shown generally as equipment which makes measurements from signals which are transmitted through a medium and which are subject to the perturbing effect. These signals may be sonic signals which are highly sensitive to the perturbing effect of changes in velocity of sound in the medium. In highly sensitive equipment such as some radars, the signals may be electrical or microwave signals which are sensitive to perturbing effects which may be a function of the medium, i.e., the air, water or earth formation through which the signals propagate. The compensating apparatus provided by the invention may be used to compensate for the perturbing effects. In FIG. 1 the signals are transmitted by a transducer 12 connected to transmit and receive circuits 14. The transducer and transmit and receive circuits may for example be the front end of a sonic distance measuring device such as described in the above identified Newman patent or as manufactured and sold by NP Industries, Inc. of Tonawanda, N.Y., and known as their SODARLEVEL equipment.

The transmit and receive circuits 14 provide outputs as to the time of transmission TA of the sonic signals and the time of reception RC thereof, which are compensated for changes in the velocity of sound. Compensation and timing of the signals is obtained by the compensating apparatus provided by the invention. This apparatus includes the function parameter generator 10, a reference parameter generator 16 and a dual slope ramp generator 18. Signals from the transmit and receive circuits 14, particularly a signal TRC, correspond to the actual reception of return signals by the transducer 12 and the receive circuits in the transmit and receive circuits 14.

The dual slope ramp generator 18 may also generate a control signal CT which times the transmission of the sonic signals by the transmit and receive circuits 14 and the transducer 12. The CT signals represent the duration of the dual slope signal which provides information as to the compensation for the perturbing effect. Thus, the TA and RC signals may be timed in accordance with the CT signals. Processing and indicating circuits 20 respond to the TA and RC signals and obtain outputs representing the measurements which are made. Since the transmissions and receptions occur repetitively, in repetitive cycles, the processing circuit obtains information as to distance from the time intervals between the TA and RC signals in the successive cycles. Inasmuch as the input signals to the processing and indicating circuit are compensated for the perturbing effect these circuits may be straight forward, conventional circuits which are designed without the need for any additional compensating or processing of the TA and RC signals. Accordingly the cost of these processing and indicating circuits 20, which constitute a major part of the instrument, may be reduced.

The dual slope ramp generator 18 may be a integrated circuit such as the MC 1505 mentioned above. It generates a ramp having adjacent portions of different slopes depending upon the amplitude of control voltages applied thereto. The function parameter generator provides a variable input voltage amplitude which controls the increasing or upslope portion of the ramp. The reference parameter generator 16 inputs a constant voltage amplitude such that the decreasing or downslope of the ramp is constant.

Figure 4:
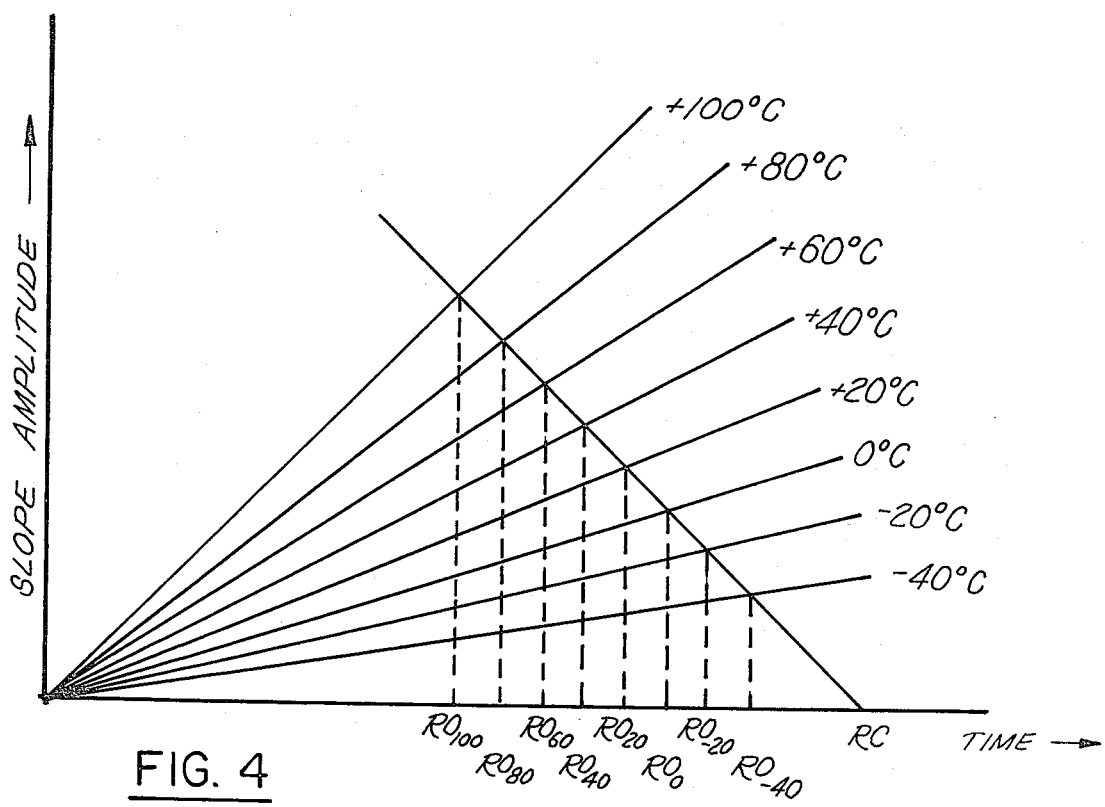
FIG. 4 is a series of curves showing the dual slope compensating signal for different temperatures and sound velocities.

FIG. 4 illustrates the various ramp signals with upslope and downslope portions which vary, depending upon the perturbing effect. In the illustrated case the perturbing effect is the velocity of sound. This velocity is measured indirectly by measurement of temperature and depends upon temperature. The function parameter generator may be a temperature transducer such as a device which provides a current which is proportional to absolute temperature (i.e., a current source which provides an output current which increases at a certain rate depending upon temperature (e.g., 1 micro amp per degree Celsius) which is converted by means of a dropping resistor into a voltage proportional to temperature. Such devices are commercially available, for example Model AD590 from Analog Devices of Norwood, Mass. So called "sing-around" transducers may also be used.

The upwardly going ramp has a slope depending upon temperature. The down ramp portion of constant slope results in a ramp having a duration which is proportional to the perturbing effect. As the temperature increases, the duration increases. Accordingly as the velocity of sound increases the time interval represented by the ramp increases. The ramp is started upon the transmission of the signal from which measurements are made. In other words, the ramp starts when the sonic signal is transmitted in sonic distance measuring apparatus. The down ramp begins when the return signal is actually received. This time is indicated aS RO on the abscissa in FIG. 4. Inasmuch as the down ramp portion is of constant slope, the time of reception is extended proportionally to the increase in sound velocity. In other words, the increase in duration of the dual ramp signal compensates to a high degree of accuracy for the decrease in propagation time of the signal due to increase of sound velocity with temperature. Accordingly, the actual return time is extended and compensated. Returns $RO_{60'}$ $RO_{40'}$ $RO_0$ . . . , have added to them compensation times $RC-RO_{6'}$ $RC-RO_{40'}$ $RC-RO_0$ . . . , with the result that RC is constant for a particular distance measured (the propagating path length of the signals in the sonic distance measuring equipment) regardless of sound velocity.

Figure 2:
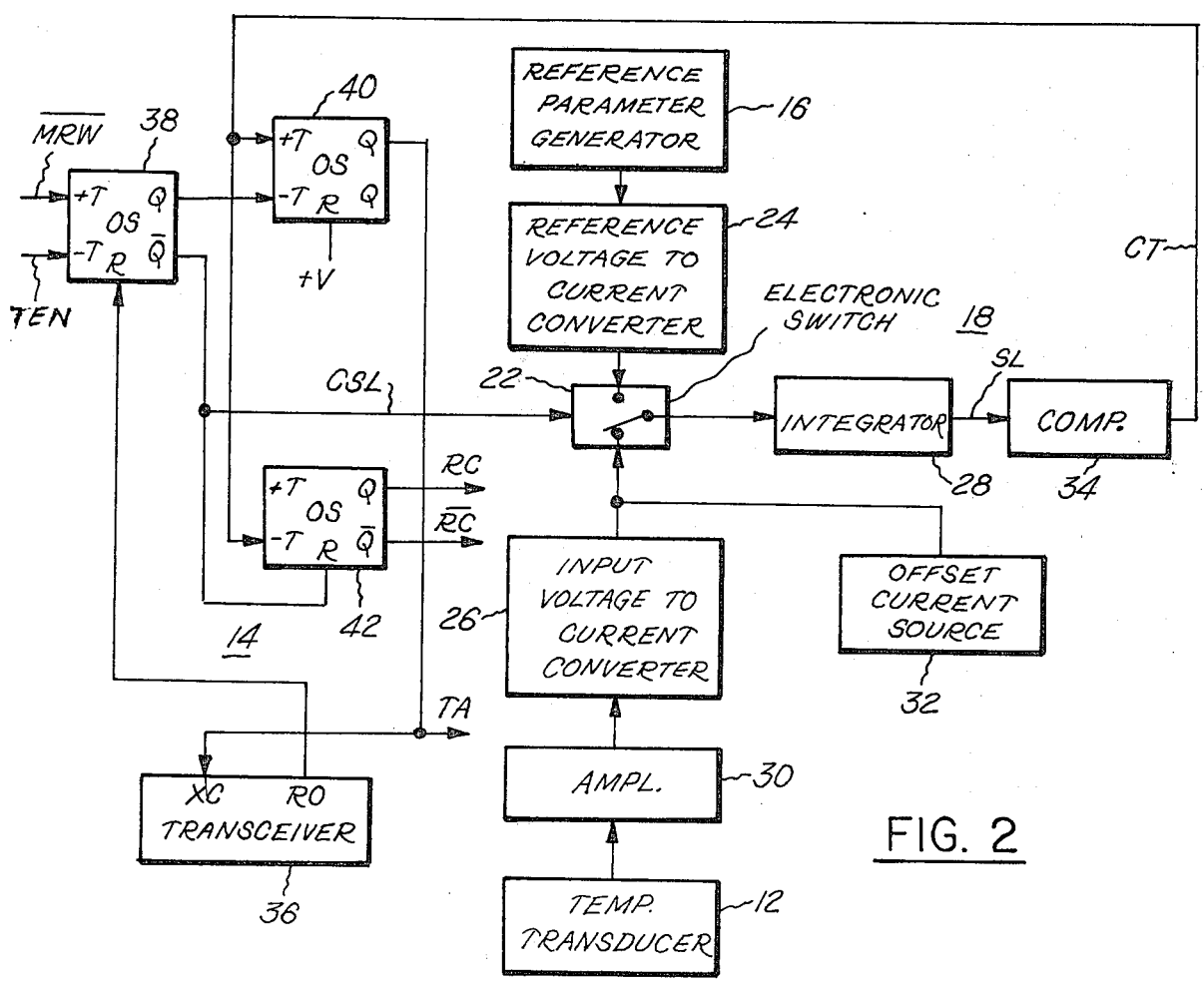
FIG. 2 is a more detailed block diagram of the system shown in FIG. 1.

The dual slope ramp generator 18, as shown in FIG. 2 consists of an electronic switch 22 which is operated by a ramp control signal CSL and switches current effectively polarized in opposite directions from current sources in a reference voltage to current converter 24 and an input voltage to current converter 26 to an integrator 28. The reference voltage to current converter is responsive to the reference parameter generator 16 which may be a source of constant voltage, such as a regulated voltage supply connected through a precision voltage divider to provide the necessary voltage level used as the reference voltage. The input voltage to current converter obtains a variable input level from the temperature transducer 12. This level may be amplified to proper level to be used by the converter 26 in an amplifier stage 30. In order that there be some initial slope to the variable slope portion of the ramp, an offset current source 32 which provides a small constant current is added to the current from the converter 26. This current source adds a fixed percentage error depending upon the slope to the increasing slope portion of the ramp signal. Since the error due to the offset current source is a fixed and controllable error, it can be readily taken into account in the processing of the compensated signal.

The integrator 28 provides the output ramp signal SL. The ramp is applied to a comparator 34 which outputs the control signal CT. This control signal has a duration corresponding to the duration of the ramp which is used to compensate for the perturbing effect.

Figure 3:
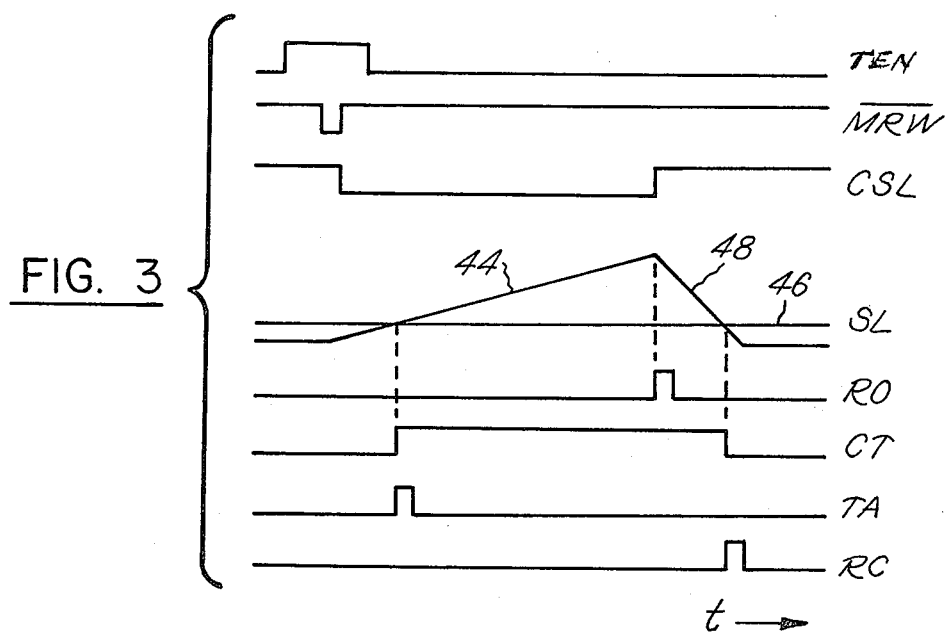
FIG. 3 is a series of wave forms occurring during the operation of the apparatus shown in FIG. 2.

The transmit and receive circuits 14 include a transceiver 36 and a logic circuit having three one shot triggerable multivibrators 38, 40 and 42. The transceiver may be an integrated circuit such as the type LM 1812 which is manufactured by National Semiconductor Company of Santa Clara, Calif. When a return signal is received, the transceiver 36 outputs a pulse RO. Each transmission cycle is started by an external timing generator which may be contained in a computer which controls an instrumentation system including the sonic distance level measurement equipment shown in FIG. 2. Two commands are inputted to the one shot 38. These are the TEN and the MRW commands. The transmission is enabled by the TEN command and on the positive going edge of the MRW command (see FIG. 3), the one shot 38 is triggered to a set condition. The Q output of the one shot, CSL, goes low. This causes the electronic switch 22 to enable input current corresponding to the perturbing effect to be applied, together with the offset current, to the integrator 28. The variable slope portion 44 of the ramp signal SL is then generated. The slope of this portion 44 is directly proportional to the temperature measurement. Temperature is directly proportional to the velocity of sound in air over a wide range of temperatures from −40° C. to +60° C. Accordingly, the slope of the ramp portion 44 is directly proportional to the velocity of sound. Other transducers which directly measure the velocity of sound in air, for example the so-called "sing around" circuits which are mentioned in the above-referenced U.S. Pat. No. 3,496,524 may be used in lieu of the temperature transducer.

In order to provide for self-alignment regardless of different tolerances in different dual slope ramp generating circuits which may be used in fabricating different equipment and also in order that the compensation apparatus be self-aligning, the comparator output CT is obtained whenever the slope reaches an amplitude exceeding a reference threshold and whenever the ramp decreases below the reference threshold. The leading edge of the CT level occurs when the slope passes through a reference level 46 which is internally generated in the ramp generator 18. The positive going edge of the CT level, triggers the one shot 40. The one shot may have a recovery time equal to the desired pulse length for operating the transceiver 36 transmit circuits, for example 200 microseconds. Accordingly the one shot 40 outputs a pulse, TA upon occurrence of the leading edge of the CT level, when the ramp crosses the threshold 46. This TA pulse is concurrent with the time of transmission of the sonic signal and is applied to the processing and indicating circuits 20 (FIG. 1).

The recovery time of the one shot 38 which produces the CSL ramp control signal is much longer than the time interval for any sonic return signal. For example, it may be 500 milliseconds. When an actual return signal RO is detected by the transceiver 36, the one shot 38 is reset and the CSL ramp control signal becomes high. The electronic switch 22 then switches the constant current from the converter 24 to the integrator and produces the constant slope down ramp portion 48 of the ramp signal SL. When this down ramp portion again crosses the threshold 46 the comparator switches and its lagging edge CT triggers the one shot 42 which has been enabled to be set by the CSL level applied to the reset level thereof. Then the compensated return RC is outputted by the one shot 42. The TA and RC signals are applied to the processing and indicating circuits 20 and the distance information is derived therefrom on each transmission cycle.

From the foregoing description it will be apparent that there has been provided improved compensation apparatus which is particularly adapted for compensating for perturbing effects which can introduce error in instrumentation measurement. The invention has been described by way of example in connection with sonic distance measuring equipment and its applications in other instrumentation have been indicated. The perturbing effect in the preferred embodiment is the change in sound velocity and temperature is the principal parameter which causes the change in the sound velocity. Other parameters may effect sound velocity, such as a change in gas or vapor composition, which the invention is eminently suited to compensate. Modifications and variation of the herein described system as well various applications thereof, within the scope of the invention, will undoubtedly suggest themselves to those skilled in the art. Accordingly the foregoing description should be taken as illustrative and not in a limiting sense.

I claim:

1. For use in apparatus dependent upon the transmission of signals through a medium, compensation apparatus which comprises means responsive to a function affecting said transmission for generating a first output corresponding thereto, means for generating a compensating signal having dual adjacent slope portions, the slope of one of said portions depending upon said first output and the slope of the other of said portions being constant, means responsive to said signal for timing the occurrence of said slope portions, and means for compensating said signals in accordance with the duration of said dual slope compensating signal.

2. The invention as set forth in claim 1 further comprising reference generating means for generating a second output, said compensating signal generating means being responsive to said second output for controlling the slope of said other of said portions.

3. The invention as set forth in claim 1 wherein said compensating signal generating means includes means for generating said other slope portion after said one slope portion.

4. The invention as set forth in claim 1 wherein said means for generating said first output is responsive to the condition of said medium.

5. The invention as set forth in claim 1 wherein said means for generating said first output is responsive to the velocity of propagation of said signals in said medium.

6. For use in compensating a sonic apparatus for variations in the velocity of sound, compensation apparatus comprising dual slope ramp generating means for generating a ramp signal having first and second portions of increasing and decreasing amplitude, means responsive to the velocity of sound for varying the slope of said first portion, means for maintaining the slope of said second portion constant, means responsive to the duration of at least one of said first and second portions for producing an output compensated for the velocity of sound.

7. The invention as set forth in claim 6 wherein said dual slope ramp generating means includes means for initiating said first ramp portion with the transmission of a sonic signal and terminating said first ramp portion and initiating said second ramp portion upon reception of said sonic signal.

8. The invention as set forth in claim 6 wherein said means responsive to the velocity of sound comprises a temperature transducer for providing a control signal the amplitude of which corresponds to the velocity of sound, and said dual slope ramp generating means includes means for varying the slope of said first portion with said control signal.

9. The invention as set forth in claim 7 wherein said dual slope generating means comprises comparator means for providing a first control signal when said ramp signal amplitude changes in one sense and exceeds a certain level and a second control signal when said ramp signal changes in the opposite sense and becomes less than said certain level, said initiating means being responsive to said first control signal, and means responsive to said second control signal for providing an output responsive to said second control signal for providing an output signal corresponding to the reception of said sonic signal the time of occurrence of which output signal is compensated for variations in the velocity of sound.

10. The invention as set forth in claim 9 wherein said means responsive to said velocity of sound includes means generating a first signal of amplitude proportional to said sound velocity, and means for generating a second signal of constant amplitude and relative polarity opposite to said first signal.

11. The invention as set forth in claim 10 wherein said dual slope ramp generating means comprises integrator means responsive to said first and second signals for generating said first and second portions of said ramp signal.

12. The invention as set forth in claim 11 further comprising means for generating an offset signal of fixed amplitude and of the same polarity as said first signal and adding said offset signal to said first signal to provide an offset slope to said first portion which is fixed, and which adds to the duration of the second portion of said ramp an amount of time that is a fixed percentage of the total duration of said second portion.

13. Echo sounding distance measuring apparatus comprising means for transmitting in successive cycles sonic signals and receiving actual return signals after a time interval corresponding to the distance being measured, means responsive to the velocity of propagation of sound for providing a first control signal having an amplitude proportional thereto, means for generating a ramp signal having first and second portions of variable and constant slope which vary in amplitude in opposite senses, means for varying the slope of said first portion in accordance with the amplitude of said first control signal, means responsive to said actual return signals for initiating said second portion of said ramp signal, and means for deriving from said second portion of said ramp signal a compensated return signal with the time interval between said actual return signals and said compensated return signals being proportional to the velocity of sound.

14. The invention as set forth in claim 13 wherein said ramp signal generating means comprises a dual ramp integrated circuit having an integrator, reference and input current sources of controllable current amplitude, a comparator, and means for switching said current sources to selectively connect them to said integrator to provide said first and second ramp portions.

15. The invention as set forth in claim 14 wherein said velocity of sound responsive means comprises means responsive to the temperature of the medium through which said sonic signals propagate for providing said first control signal, means for varying the current supplied from said one of said sources to said integrator in response to said first ramp portion to vary the slope thereof, means for maintaining the current supplied from the other of said sources to said integrator constant to maintain the slope thereof constant, first, second and third one shot multivibrator circuits, said first one shot being connected to said switching means in said integrated circuit to provide an output alternately of first and second levels, means operated during each cycle of said cycles for conditioning said first one shot to produce said first output level whereby said first ramp portion is produced, said comparator being connected in triggering relationship with said second one shot for conditioning said second flip-flop to produce a transmit control output pulse, said second flip-flop being connected to said sonic signal transmitting and receiving means to cause said sonic signals to be transmitted during each said cycle upon occurrence of said transmit control output pulse therefrom, transmitting and receiving means being connected in triggering relationship in said first one shot to condition it to produce said second output level whereby said second ramp portion is produced, and said comparator being connected in triggering relationship to said third one shot to cause said third one shot to produce a pulse to provide said compensated return signal.

* * * * *

UNITED STATES PATENT AND TRADEMARK OFFICE
CERTIFICATE OF CORRECTION

PATENT NO. : 4,317,184

DATED : February 23, 1982

INVENTOR(S) : Nicholas G. Leszczynski

It is certified that error appears in the above-identified patent and that said Letters Patent are hereby corrected as shown below:

Column 5, line 5, change "$RC-RO_{6:}$," to -- $RC-RO_{60}$, --.

Column 7, (claim 9), lines 56 and 57, cancel "responsive to said second control signal for providing an output".

Signed and Sealed this

Twentieth Day of April 1982

[SEAL]

Attest:

GERALD J. MOSSINGHOFF

*Attesting Officer*          *Commissioner of Patents and Trademarks*